United States Patent
Corno et al.

(10) Patent No.: US 12,380,610 B2
(45) Date of Patent: Aug. 5, 2025

(54) DRIVING ASSISTANCE METHOD AND SYSTEM

(71) Applicant: POLITECNICO DI MILANO, Milan (IT)

(72) Inventors: Matteo Corno, Milan (IT); Luca Franceschetti, Milan (IT); Sergio Matteo Savaresi, Milan (IT); Marco Centurioni, Milan (IT)

(73) Assignee: POLITECNICO DI MILANO, Milan (IT)

( * ) Notice: Subject to any disclaimer, the term of this patent is extended or adjusted under 35 U.S.C. 154(b) by 120 days.

(21) Appl. No.: 18/553,397

(22) PCT Filed: Mar. 18, 2022

(86) PCT No.: PCT/IB2022/052467
§ 371 (c)(1),
(2) Date: Sep. 29, 2023

(87) PCT Pub. No.: WO2022/208222
PCT Pub. Date: Oct. 6, 2022

(65) Prior Publication Data
US 2024/0362827 A1    Oct. 31, 2024

(30) Foreign Application Priority Data

Mar. 30, 2021    (IT) .................. 102021000007862

(51) Int. Cl.
*G06T 11/00* (2006.01)
*G06T 7/593* (2017.01)
*G06T 7/73* (2017.01)

(52) U.S. Cl.
CPC ............. *G06T 11/00* (2013.01); *G06T 7/593* (2017.01); *G06T 7/74* (2017.01);
(Continued)

(58) Field of Classification Search
CPC . G06T 11/00; G06T 7/593; G06T 7/74; G06T 2207/10012; G06T 2207/30244;
(Continued)

(56) References Cited

U.S. PATENT DOCUMENTS 10,848,920 B1 *  11/2020  Olafsson ............... G06F 16/748
11,366,319 B1 *   6/2022  Douglas ............. G02B 27/0093
(Continued)

FOREIGN PATENT DOCUMENTS

| IT | 20190017429 | 3/2021 | |
| WO | WO-2006037402 A1 * | 4/2006 | ......... G01C 21/3602 |
| WO | 2017207015 A1 | 12/2017 | |

OTHER PUBLICATIONS

International Search Report issued Jul. 22, 2022, in corresponding International Application No. PCT/IP2022/052467, 3 pages.

*Primary Examiner* — Maurice L. McDowell, Jr.
(74) *Attorney, Agent, or Firm* — Maier & Maier, PLLC

(57) ABSTRACT

A method of assisting driving a vehicle. The method is implemented by a system including an HMD and a positioning module mounted on the vehicle, wherein the HMD includes a screen and a pair of video cameras located on opposite sides of the screen along a main length direction of the screen.

10 Claims, 10 Drawing Sheets

(52) U.S. Cl.
CPC ............... *G06T 2207/10012* (2013.01); *G06T 2207/30244* (2013.01); *G06T 2207/30252* (2013.01)

(58) Field of Classification Search
CPC ........ G06T 2207/30252; H04N 13/117; H04N 13/128
See application file for complete search history.

(56) References Cited

U.S. PATENT DOCUMENTS

| | | | |
|---|---|---|---|
| 2016/0084661 A1* | 3/2016 | Gautama | G01C 21/26 701/400 |
| 2018/0225808 A1* | 8/2018 | Chakraborty | B60K 35/10 |
| 2018/0288386 A1 | 10/2018 | Lazarow et al. | |
| 2022/0092816 A1* | 3/2022 | Houts | G01S 17/89 |

* cited by examiner

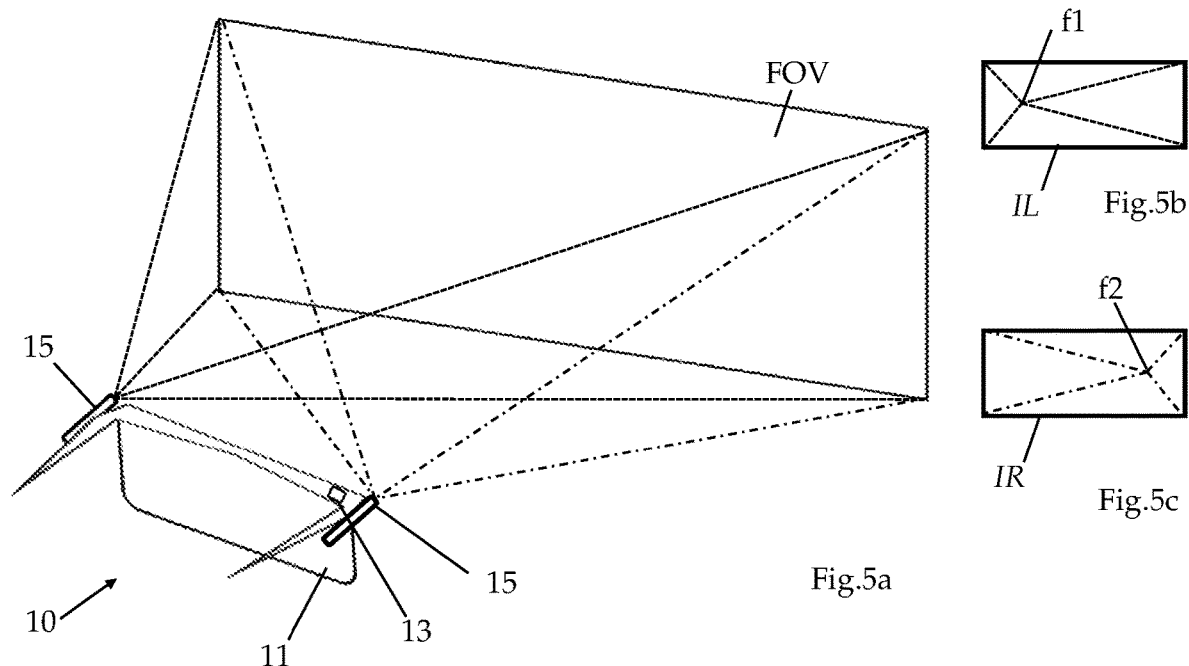
Fig.5b
Fig.5c
Fig.5a
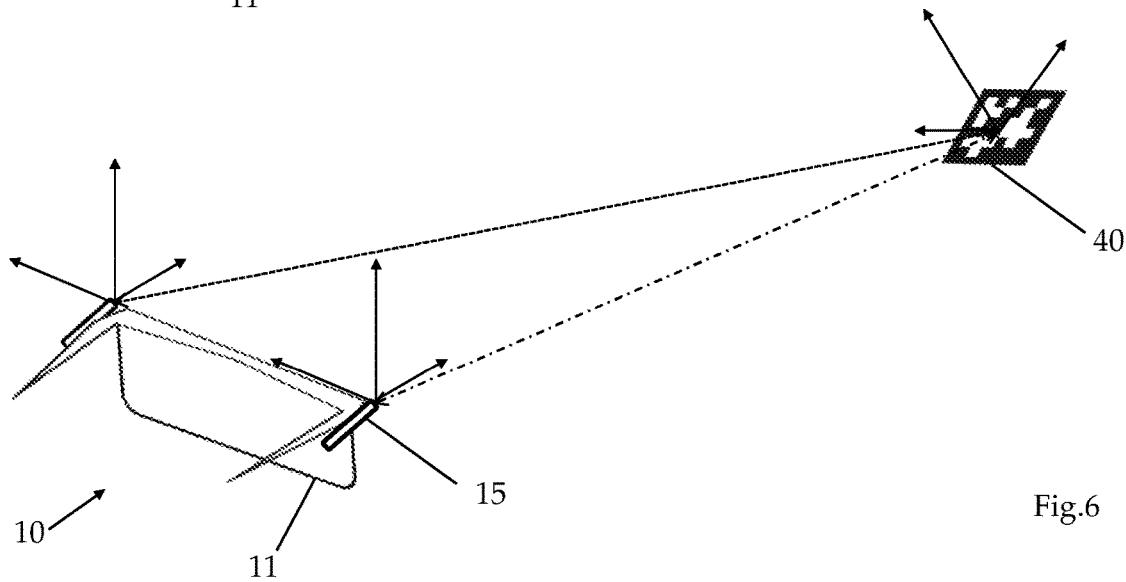
Fig.6
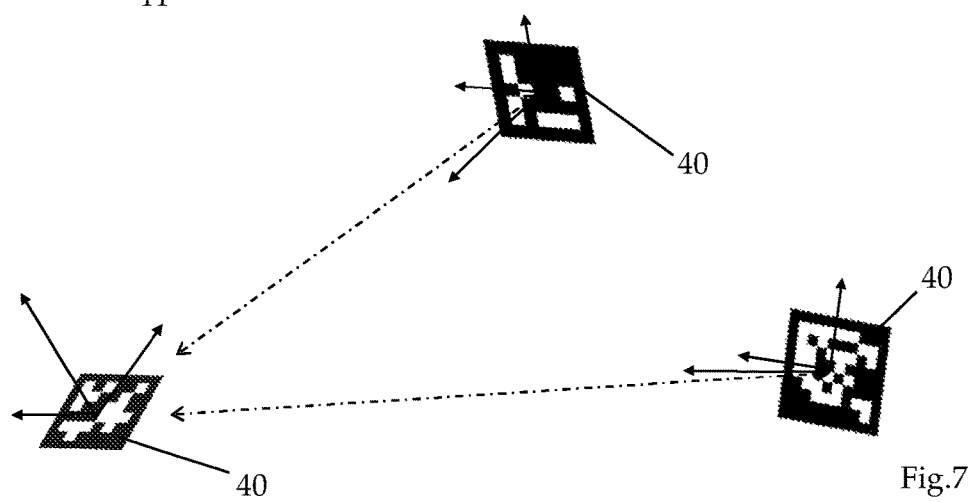
Fig.7

DRIVING ASSISTANCE METHOD AND SYSTEM

TECHNICAL FIELD

The present invention refers to the field of electronics. In more detail, the present invention relates to a driving assistance method and system.

BACKGROUND

To date, driving information such as information on movement speed, fuel level, navigation directions or the like, is shown in the dashboard of a vehicle or on any infotainment screens with which the vehicle is equipped. Both the dashboard and the screens are often located in the vehicle in positions which require the driver to take his eyes at least partially off the road environment, thus reducing both driving safety and the possibility of using such information.

In the automotive and aviation sectors, 'Head Up Displays', or HUD for short, have been proposed as a partial solution to this problem. An HUD is a system which allows to project images onto the windscreen of a vehicle. In particular, HUDs allow information to be projected directly onto the car's windscreen, allowing the user to stay focused on driving, always keeping his gaze on the road.

However, the current standard of HUDs, known as HUD 1.0, is only used to show redundant information provided by classic on-board instrumentation. Furthermore, the Applicant has observed that the HUD technology does not allow to effectively depict elements of augmented reality. In fact, the extension required by the projection system for a complete coverage of the driver's field of view is much greater than that technologically available at the current state of the art. In particular, there are no HUDs capable of exploiting the entire main field of view substantially defined by the vehicle's windscreen, as well as a secondary field of view, such as one or more side windows.

Alongside the HUD systems, more recently systems based on wearable screens have been proposed, better known as 'Head Mounted Displays', or HMD for short, which comprise a transparent or semi-transparent screen on which images can be reproduced, for example to provide driving assistance information to a user wearing the HMD while driving the vehicle.

For example, US 2016/084661, EP 2933707, US 2015/317834 and US 2015/097864 describe driving assistance systems that involve the use of an HMD.

Furthermore, G. Berg, "*Das Vehicle in the Loop: Ein Werkzeug für die Entwicklung und Evaluation von sicherheitskritischen Fahrerassistenzsystemen*", München, Univ. der Bundeswehr, Diss., 2014 describes a driving assistance system comprising the use of an HMD and static (marker) and dynamic (head tracker) reference elements in order to accurately determine the pose of images acquired by the HMD with respect to the vehicle.

The Applicant noted that the known systems are quite complex to be made and offer limited quality in placing augmented reality images in the user's field of view. In fact, the Applicant observed that in known systems the augmented reality images do not harmonise with the real environment framed by the HMD. In particular, augmented reality images appear in positions that are offset with respect to their intended placement, particularly in the case of augmented reality images that are intended to appear superimposed, or arranged, over a flat surface like the road surface and/or in the case of augmented reality objects at a considerable distance from the observation point, i.e. from the position of the HMD, e.g. a distance of the order of a hundred metres.

SUMMARY

Aim of the present invention is to overcome the drawbacks of the prior art.

In particular, aim of the present invention to provide a driving assistance method and relative system configured to reproduce augmented reality images through an HMD such that they harmonize with the surrounding environment observed by a user through the HMD.

A further aim of the present invention is to propose a method and a relative system that allow reproducing augmented reality objects intended to be superimposed on a surface, in particular a road surface, in an optimal manner.

These and other objects of the present invention are achieved by a system incorporating the features of the annexed claims, which form an integral part of the present description.

According to a first aspect, the present invention is directed to a vehicle driving assistance method. The method is implemented by a system comprising an HMD and a positioning module mounted on the vehicle, wherein the HMD comprises a screen and a pair of video cameras located on opposite sides of the screen along a main length direction of the screen.

The method comprises the steps of:

a. acquiring a pair of images by means of the HMD, each image being acquired by a respective camera of the HMD and framing a same portion of field of view, said same portion of field of view comprising a portion of road surface;

b. estimating a position in a three-dimensional space of each point comprised in the same portion of field of view based on the pair of acquired images and the characteristics of the video cameras;

c. estimating a volume of interest of the three-dimensional space comprising the portion of the road surface based on the pair of images acquired and a position determined by the positioning module in the contiguity of the acquisition of the pair of images;

d. selecting a subset of points comprised in the same portion of the field of view and comprised in the volume of interest;

e. calculating a planar surface corresponding to the road surface based on the estimated position of the points comprised in the subset of selected points, and g. reproducing a two-dimensional image on the screen of the HMD so that it is arranged on the planar surface corresponding to the road surface calculated in step e.

Thanks to this solution, the two-dimensional images, i.e. the augmented reality images reproduced by the screen, are perceived by the user wearing the HMD as (virtual) objects correctly positioned within the field of view even at long distances, e.g. in the order of hundreds of metres from the user wearing the HMD. In particular, the augmented reality objects displayed in the contiguity of the road surface are correctly arranged thereon, as if they were images drawn on the road surface or physical three-dimensional objects resting on the road surface. Consequently, a so-called "uncanny valley" effect is avoided—due to a lack of harmony between the real environment and the augmented reality images reproduced on the HMD screen—which can negatively affect the perceptions and/or driving performance of a user wearing the HMD.

In one embodiment, each acquired image is a digital image, thus comprising a plurality of pixels arranged aligned along rows and columns. In such a case, the step b. of estimating a position in a three-dimensional space of each point comprised in the same portion of the visual field comprises:
- for each pixel of an image of the pair associated with a point comprised in the same portion of the field of view, identifying a corresponding pixel in the other image of the pair associated with the same point comprised in the same portion of the field of view, and
- determining a position of said point in the three-dimensional space by performing a triangulation of the point starting from said pair of pixels.

Preferably, the step of identifying a corresponding pixel in the other image of the pair comprises calculating a disparity map by comparing the images of the pair.

Furthermore, determining a position of said point in the three-dimensional space comprises using a disparity value between the corresponding pixels of the pair of images comprised in the disparity map in the triangulation of the point.

By taking advantage of images acquired from points of view spaced by the HMD screen, it is possible to determine a distribution in a three-dimensional space (or volume) effectively and reliably.

In one embodiment, step c. of estimating a volume of interest of the three-dimensional space comprising the portion of the road surface comprises:
- estimating an approximate position of the portion of the road surface based on the pair of images and of the position determined by the positioning module at the acquisition of the pair of images;
- calculating or selecting a first offset value;
- calculating or selecting a second offset value;
- defining the volume of interest as a volume delimited by a first boundary surface positioned at a height equal to the approximate position of the portion of the road surface plus the first offset value of and a second boundary surface positioned at a height equal to the approximate position of the portion of road surface minus the second offset value.

In this way it is possible to determine a volume of interest containing the road surface in a particularly simple and fast way in computational terms, with the result of obtaining a filter capable of effectively separating points in the three-dimensional space (obtained from the acquired images) belonging to the road surface.

Preferably, the volume of interest extends:
- starting from a distance from the position of the HMD equal to or greater than a minimum threshold value in a direction parallel to a longitudinal length of the vehicle, preferably the minimum threshold value is comprised between 5 m and 15 m, more preferably the minimum threshold value is equal to 10 m, and
- up to a distance from the position of the HMD equal to or less than a maximum threshold value in the direction parallel to a longitudinal length of the vehicle, preferably the maximum threshold value is comprised between 50 m and 150 m, more preferably the maximum threshold value is equal to 100 m.

Additionally or alternatively, the volume of interest has a width substantially corresponding to the width of the road surface in a direction transverse to a longitudinal length of the vehicle, preferably the width it is between 3 m and 12 m, more preferably the width is equal to 6 m.

The Applicant has determined that these intervals of values allow the computational complexity of the method to be contained without substantially reducing the effectiveness of the method in providing optimal positioning of the augmented reality images.

In one embodiment, the step e. of calculating a planar surface comprises elaborating the subset of points of the same portion of the visual field comprised in the volume of interest by means of an algorithm of the M-estimator sample consensus (MSAC) type.

The Applicant has determined that the MSAC-type algorithms are particularly efficient and reliable in calculating the planar surface corresponding to the road surface.

In one embodiment, the system further comprises at least one reference element arranged inside the vehicle. In addition, each two-dimensional image to be reproduced on the HMD screen represents a virtual object defined by a set of points in a three-dimensional space. In such a case, the method further comprises:
- determining a position of the HMD based on the position determined by the positioning module, and of a position of the at least one reference element framed by the cameras of the HMD,
- based on the position of the HMD, determining a view volume corresponding to a volume of space comprised in the field of view of the HMD;
- if at least one virtual object to be reproduced as a two-dimensional image is comprised in the view volume, step g. of reproducing a two-dimensional image on the screen of the HMD comprises:
  - correcting each point of the set of points of a three-dimensional space based on the position determined by the positioning module and of the planar surface calculated in step e.;
  - calculating a screen position in which to display the two-dimensional image associated with the virtual object based on the correct points of the set, and
  - reproducing the two-dimensional image on the display of the HMD in the screen position.

Preferably, correcting each point of the set of points in a three-dimensional space comprises:
calculating each correct point as:

$$wp' = wp - (wp - p) \cdot \vec{n},$$

where wp is the coordinate of the point, wp' is the corrected coordinate of the point, p is the projection of the position of the HMD on the planar surface and $\vec{n}$ is the vector normal to the planar surface.

By recalculating the points in the three-dimensional space that define the virtual object based on the planar surface, the resulting two-dimensional image of augmented reality will produce in the user a perception of the virtual object precisely positioned with respect to the road surface.

A different aspect of the present invention relates to a driving assistance system comprising:
- an HMD comprising a screen and a pair of video cameras located on opposite sides of the screen along a main length direction of the screen;
- a positioning module mounted on the vehicle configured to detect a position of the vehicle,
- a memory area in which at least one set of points associated with a virtual object to be displayed as a two-dimensional image is stored, and a processing unit operatively connected to the positioning module, to the HMD, and configured to implement the method according to any one of the embodiments described above.

The system thus configured makes it possible to obtain the advantages set forth above for the considered embodiments of the method.

Further features and advantages of the present invention will be more evident from the description of the accompanying drawings.

BRIEF DESCRIPTION OF THE DRAWINGS

The invention is described hereinbelow with reference to certain examples provided by way of non-limiting example and illustrated in the accompanying drawings. These drawings illustrate different aspects and embodiments of the present invention and reference numerals illustrating structures, components, materials and/or similar elements in different drawings are indicated by similar reference numerals, where appropriate.

FIG. 5a schematically illustrates a field of view visible through the HMD;

FIG. 5b schematically illustrates a field of view visible through the HMD;

FIG. 5c schematically illustrates a field of view visible through the HMD;

FIG. 6 is a schematic isometric view illustrating an identification and determination step of orientation and position of a marker of the system of FIG. 1;

FIG. 7 is an axonometric view which schematically illustrates three markers of the system of FIG. 1 having different orientations and positions;

DETAILED DESCRIPTION OF THE EMBODIMENTS

Figure 1:
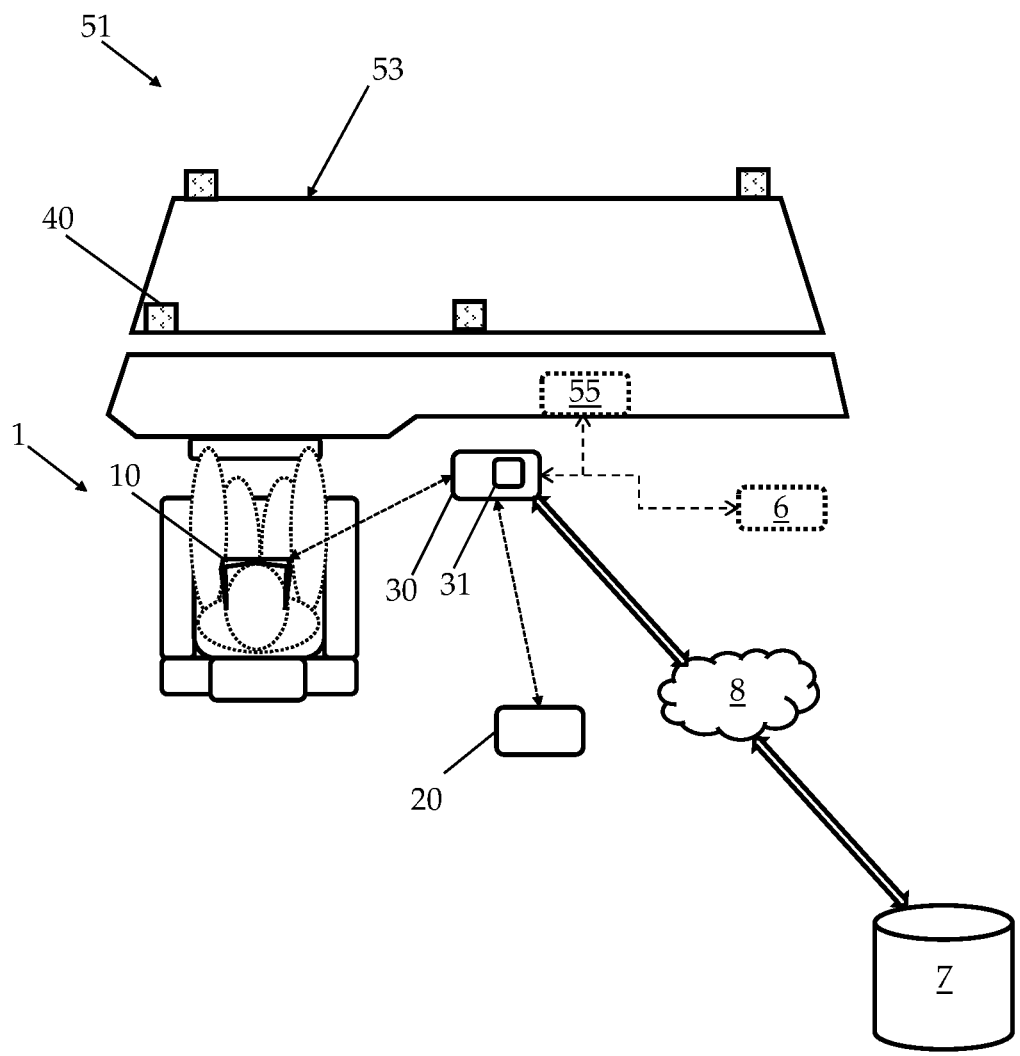
FIG. 1 is a schematic view of the system according to an embodiment of the present invention installed on a vehicle.

While the invention is susceptible to various modifications and alternative constructions, certain preferred embodiments are shown in the drawings and are described hereinbelow in detail. It must in any case be understood that there is no intention to limit the invention to the specific embodiment illustrated, but, on the contrary, the invention intends covering all the modifications, alternative and equivalent constructions that fall within the scope of the invention as defined in the claims.

The use of "for example", "etc.", "or" indicates non-exclusive alternatives without limitation, unless otherwise indicated. The use of "includes" means "includes, but not limited to" unless otherwise indicated.

With reference to the figures, a system 1 according to the embodiments of the present invention comprises a wearable screen, referred to by the name of Head Mounted Display, or HMD 10, a positioning module, for example a GNSS module 20 (Global Navigation Satellite System), a processing unit 30 configured to connect to the GNSS module 20 and to the HMD 10, and one or more reference elements, for example ArUco-type markers 40.

The GNSS module 20 is configured to provide periodically and/or upon request an indication on a detected position, preferably, defined in a three-dimensional reference system originating in the centre of the Earth—referred to below with the term 'global reference system'. For example, the GNSS module 20 comprises a GPS navigator and is configured to provide a set of geographical coordinates indicative of a global position detected by the GNSS module 20 and therefore of the vehicle 5. Preferably, the set of coordinates provided by the GNSS module 20 are referred to a central portion of the vehicle 5, observed from above (i.e., a central portion of the vehicle with respect to a plan view thereof).

Figure 2:
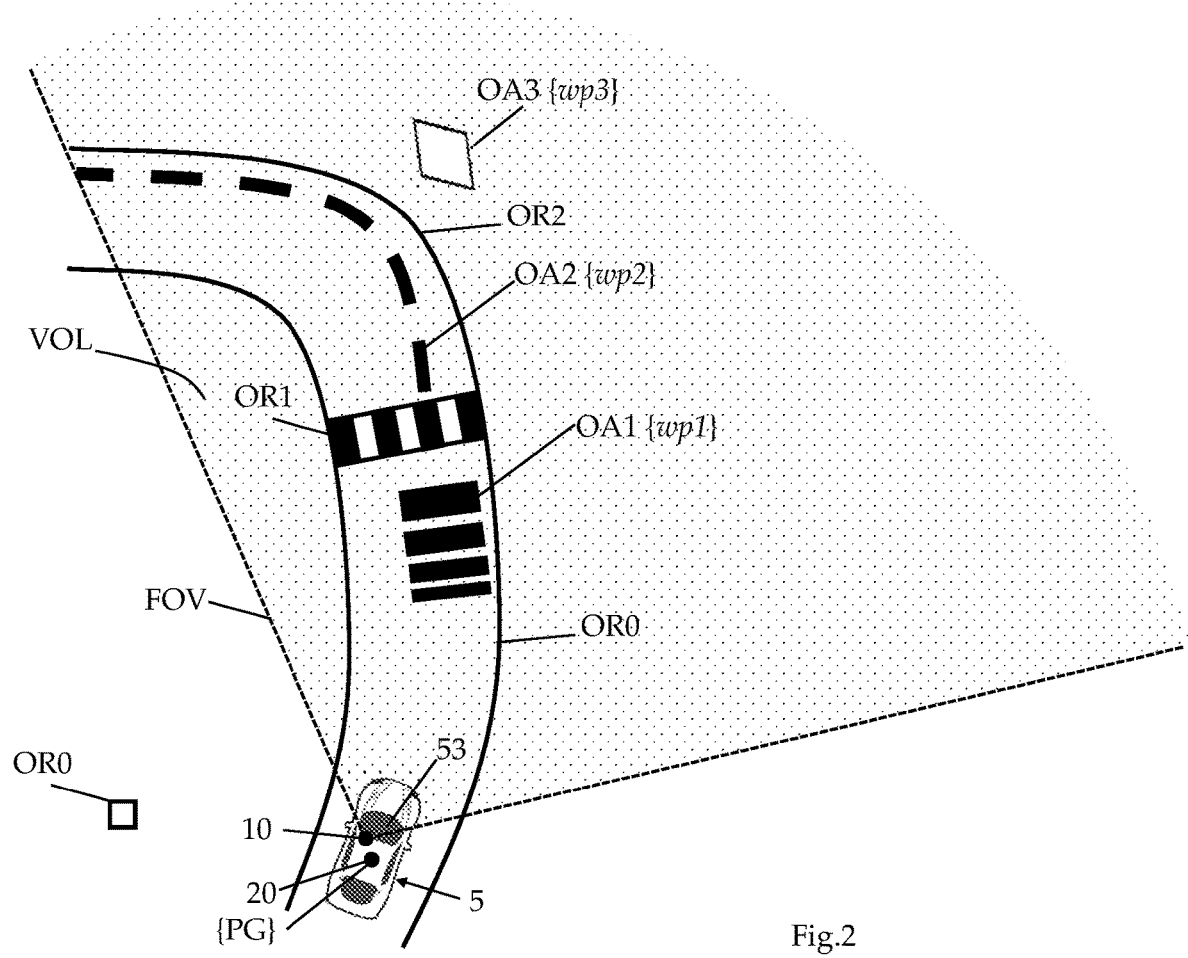
FIG. 2 is a schematic top view of a travelling vehicle in which the system according to an embodiment of the present invention is installed.
Figure 3:
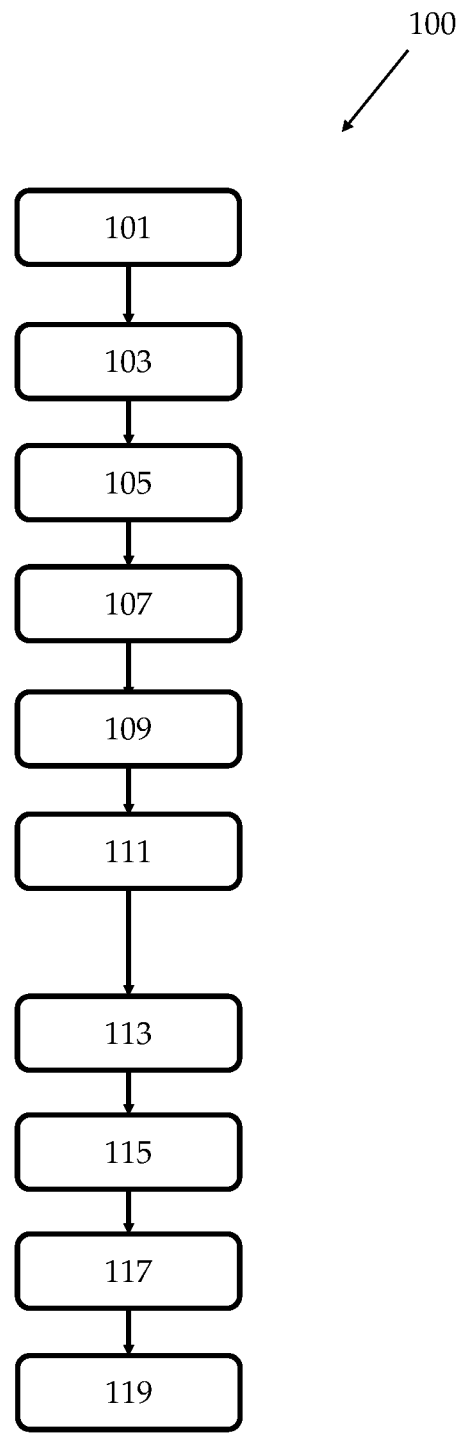
FIG. 3 is a flow diagram of a system calibration procedure according to an embodiment of the present invention.

The HMD 10 comprises a transparent and/or semi-transparent screen 11, such as to allow a user wearing the HMD 10 to see through the screen 11 (as schematically illustrated in FIGS. 5a and 6). Furthermore, the HMD 10 is configured—for example, it comprises suitable circuitry (not illustrated)—to display images on the screen 11 which are superimposed on what is present in the field of view (FOV) of a user wearing the HMD 10—referred to below as 'field of view FOV of the HMD 10' for the sake of brevity (schematically illustrated in FIG. 2)—, thus creating an augmented reality effect. For this purpose, the HMD 10 may comprise a local processing unit 13 configured to generate the images to be displayed based on data and/or instructions provided by the processing unit 30.

The HMD 10 comprises a pair of cameras 15 configured to frame a substantially same region of space from different points of view (as schematically illustrated in FIGS. 5c).

Advantageously, the cameras 15 of the HMD 10 are arranged on opposite sides of a frame of the screen 11 of the HMD 10. In other words, the cameras of the pair 15 are separated from each other by a known and constant distance along a main length direction of the screen 11, preferably parallel to a line joining the eyes of a user wearing the HMD 10. Each of the cameras 15 is configured to acquire one or more images substantially corresponding to the FOV of the HMD 10.

The processing unit 30 comprises one or more of microcontrollers, microprocessors, general purpose processors (for example, CPU) and/or graphic processors (for example, GPU), DSP, FPGA, ASIC, memory modules, power modules for supplying energy to the various components of the processing unit 30, and preferably one or more interface modules for connection to other apparatuses and/or for exchanging data with other entities (for example, the HMD 10, the GNSS module 20, a remote server, etc.).

The processing unit 30 also comprises a memory area 31—and/or is connected to a memory module (not illustrated)—in which information relating to one or more augmented reality objects OA, i.e. virtual objects, can be stored. Examples of augmented reality objects OA comprise a stopping space OA1, an optimal trajectory OA2 and a virtual signpost OA3 (illustrated schematically in FIG. 2).

In one embodiment, at least the augmented reality objects OA are defined by a set of points {wp} called 'world points' in the technical jargon. In general, each world point of a generic set of world points {wp} comprises a vector of coordinates of a three-dimensional space. In the example considered, the set of world points {wp} defines a shape of the respective augmented reality object in the three-dimensional space defined through the global reference system.

Preferably, the memory area 31 is configured to store information about one or more real objects OR.

Examples of real objects OR comprise a road travelled OR0 by the vehicle 5, a pedestrian crossing OR1, a curve in the travelled road OR2 (illustrated schematically in FIG. 2), a building, a monument, a billboard, a point of cultural interest, a viewpoint, etc.

Each real object OR is associated with a set of coordinates of the global reference system that define the position of the considered real object OR in the space.

The set of word points {wp} of one or more augmented reality objects OA can be defined in absolute terms—e.g., each world point corresponds to a set of coordinates of the global reference system—or related, e.g., as a function of the coordinates of a real object OR. For example, the set of world points {wp1} of the stopping space OA1 can be defined as a function of the set of coordinates of the pedestrian crossing OR1.

Optionally, the memory area 31 is configured to store one or more additional information regarding one or more real objects OR augmented reality objects OA—such as an image and/or textual information, etc.

In a preferred embodiment, the processing unit 30 is configured to connect to an inertial measurement unit, or IMU 6, and/or to a data BUS 55 of the vehicle 5 on which the processing unit 30 is mounted—for example, a LIN/CAN bus—to access data (for example: speed, acceleration, steering angle, etc.) provided by on-board sensors (not illustrated) of the vehicle 5, to exploit a computing power, user interfaces and/or to exploit a connectivity of an on-board computer (not illustrated) of the vehicle 5.

Each marker 40 comprises a fiducial pattern—for example, a binary matrix consisting substantially of white or black pixels which allows it to be easily distinguished from the surrounding environment. Advantageously, the fiducial pattern of each marker 40 contains an identification code which makes it possible to uniquely identify said marker 40.

Preferably, although in a non-limiting manner, the markers 40 may comprise a backlight assembly (not illustrated) configured to backlight the fiducial pattern of the marker 40, so as to simplify an identification of the marker 40 and the fiducial pattern thereof based on images, in particular through the processing of the images acquired by the cameras 15 of the HMD 10.

In an installation step, a marker 40 is positioned inside the passenger compartment 51 of the vehicle 5 to operate as the main reference element and, preferably, a variable number of secondary markers 40, three in the example considered in the Figures, can be arranged in the passenger compartment to operate as secondary reference elements (block 101).

In the example considered, the markers 40 are positioned inside a passenger compartment 51 of the vehicle on, or in the contiguity of a windscreen 53 of the vehicle 5. This makes it possible to identify an orientation and position of the HMD 10 with respect to the markers 40 and, therefore, with respect to the windscreen 53 of the vehicle 5 through which the user observes the surrounding environment. This makes it possible to determine the field of view FOV of the HMD 10 to be determined in relation to the passenger compartment 51 of the vehicle 5 and in particular in relation to the windscreen 53. Advantageously, identifying the position and orientation of the HMD 10 with respect to the markers 40 also permits a displaying region R of the screen 11 on which to display images—as described below.

For example, considering a vehicle 5 with the driving position on the left as illustrated, an exemplary arrangement—which allows the orientation and position of the HMD 10 to be identified in a particularly reliable way—includes positioning a first marker 40 in the contiguity of one left end of the windscreen 53, a second marker 40 in a frontal position with respect to the user's position—without obstructing the view of the path—, and a third marker 40 in the contiguity of a median position of the windscreen 53 with respect to a lateral extension thereof.

After installation of the system 1 inside a passenger compartment 51 of a vehicle 5 (as schematically illustrated in FIG. 1) it is subjected to a calibration procedure 100. The calibration procedure 100 includes an alignment step and a boresighting step.

Figure 4A:
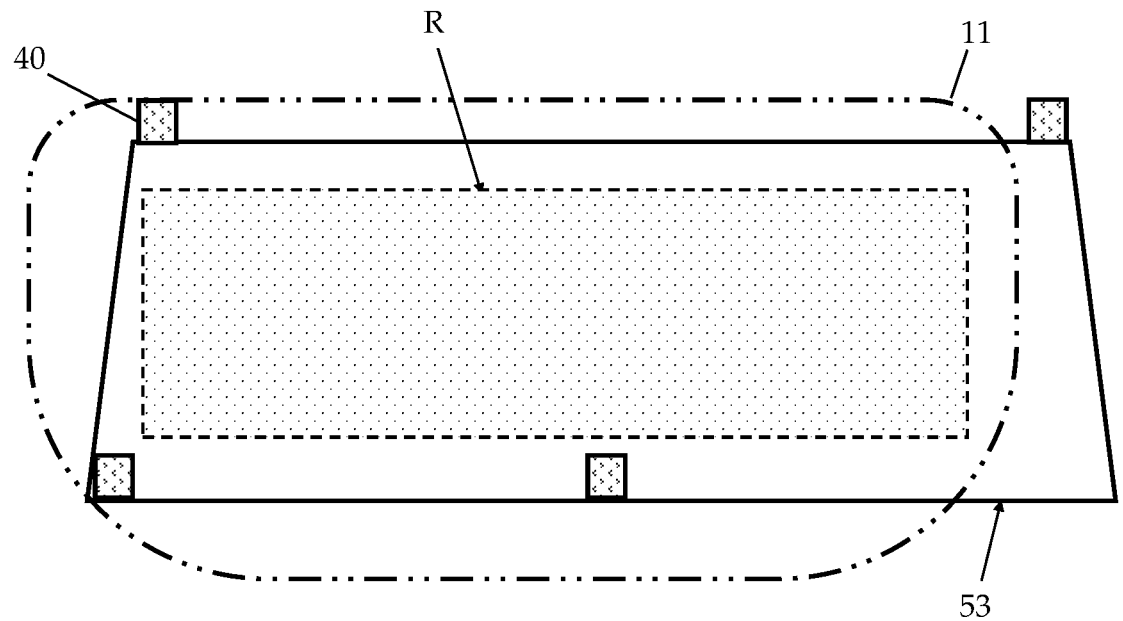
FIG. 4a is a schematic view illustrating a variation of a pose of an HMD comprised in the system of FIGS. 1 and 2.

In the alignment step, the HMD 10 is worn by a user who maintains a predetermined driving posture; preferably, with the head—and, consequently, the HMD 10—facing the windscreen 53 (e.g., as schematically shown in FIG. 4a). A pair of images IL and IR is acquired through the cameras 15 (block 101) substantially at the same instant of time. Preferably, a sequence of pairs of images IL and IR is acquired during a time interval in which the HMD 10 is held in the same position or moved slowly (for example, due to normal posture corrections or changes carried out by the user wearing the HMD 10).

Given the positioning of the cameras 15 on the side of the screen of the HMD 10 both images IL and IR will reproduce substantially the same field of view FOV of the HMD 10, but observed from different observation points f1 and f2 (as can be appreciated in FIGS. 5a-5c).

Each of the images IL and IR of the camera 15 is processed to recognise the markers 40 (block 103). For example, outlines corresponding to the markers 40 are identified in the images IL and IR, while the single markers 40 are recognized by identifying the corresponding fiducial pattern.

For each marker 40 identified in each of the images IL and IR, a relative position and orientation is calculated with respect to a reference system associated with the respective camera 15 that acquired the images IL and IR (block 105 and FIG. 6). Preferably, the position of each marker 40 is identified by finding a central point of the marker 40 in each image IL, IR. For example, a position vector tL, tR comprising coordinates of the central point of the marker 40 in each image IL, IR is calculated. In contrast, the orientation of each marker 40 is determined by first identifying the surface of the marker 40 and then by identifying the orientation of the surface of the marker 40 with respect to the reference system of the HMD 10. For example, an orientation matrix RL, RR comprising rotation angles of the surface of the marker 40 in each image IL, IR is calculated.

Next, a relative position and orientation is calculated with respect to a reference system associated with the HMD 10, i.e., a three-dimensional reference system substantially centred in the viewpoint of the user wearing the HMD 10 (block 107). Preferably, the combined positions and orientation of each marker 40 are calculated by triangulating the positions and orientation of each marker 40 calculated starting from the images IL and IR. In detail, the combined position of a generic marker 40 is calculated by triangulation from the positions of the central point of the marker 40 determined starting from the images IL and IR. Similarly, the combined orientation of a generic marker 40 is calculated by triangulation from the orientations of the surface of the marker 40 calculated starting from the images IL and IR. In other words, the position vector and orientation matrix pairs [tL, RL] and [tR, RR] obtained starting from the images IL and IR are combined together and so as to obtain the combined position vector and orientation matrix pair [tHMD, RHMD]. For example, the triangulation operations mentioned above are performed in accordance with Hartley, R. and A. Zisserman: *"Multiple View Geometry in Computer Vision"* Cambridge University Press, p. 312, 2003.

A marker 40 is selected as the main marker (block 109). For example, the marker 40 with the best visibility in the acquired images IL and IR or the marker 40 with a predefined identification code is selected as the main marker.

Then, relationships linking the position of each marker 40 to the position of the main marker 40 are calculated (block 111 and FIG. 7). Preferably, the relationships among markers 40 are defined by means of rototranslation operations, i.e. matrix operations of homogeneous transformation.

The boresighting step of the calibration procedure 100 establishes a law of compensation between the position of the GNSS module 20 and the actual position of the HMD 10.

Figure 8A:
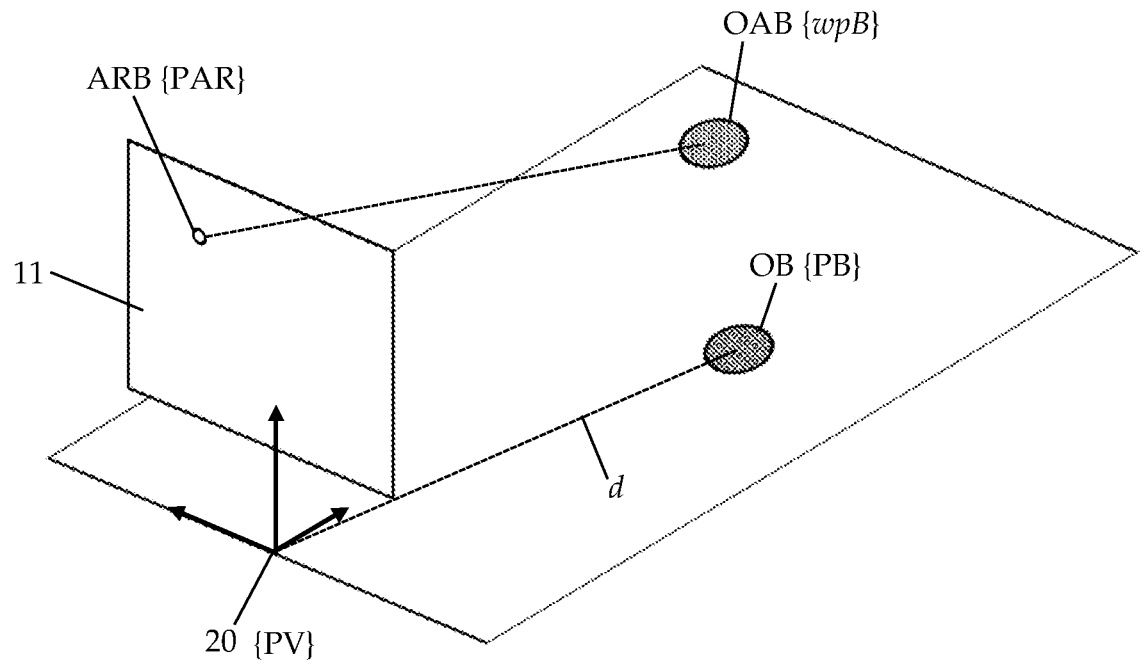
FIG. 8a is a schematic view illustrating salient steps of a system boresighting procedure according to an embodiment of the present invention.
Figure 8B:
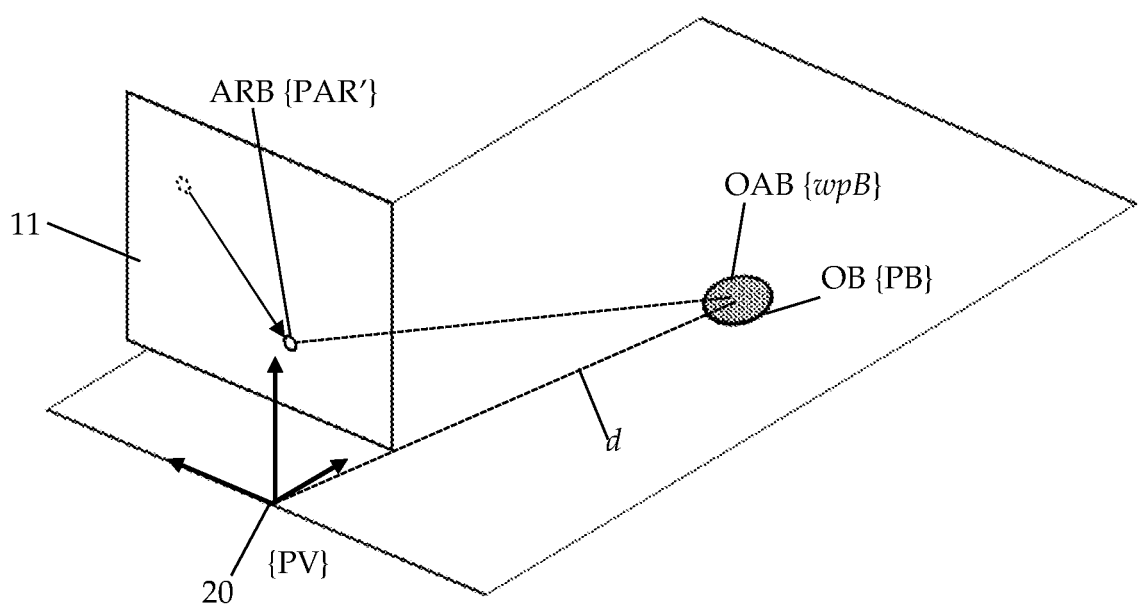
FIG. 8b is a schematic view illustrating salient steps of a system boresighting procedure according to an embodiment of the present invention.

In the preferred embodiment, the compensation law is defined by identifying a rototranslation relationship between the relative reference system associated with the reference marker 40 and the global reference system associated with the GNSS module 20. With particular reference to FIGS. 8a and 8b, initially the vehicle 5, in particular the GNSS module 20, is positioned at a predetermined distance d and with a known orientation with respect to a boresighting object OB, for example a real physical object (block 113). A boresighting position PB—that is, a set of coordinates of the global reference system—associated with the boresighting object OB is therefore known. The Applicant has identified that a straight segment can be used as a boresighting object OB to allow a precise boresighting of the system 1. However, the Applicant has found that a polygonal figure and/or a three-dimensional object allow a user to complete the boresighting step with greater simplicity.

The boresighting position PB and the position of the vehicle PV measured by the GNSS module 20 are used to determine a corresponding (two-dimensional) boresighting (augmented reality) image ARB that is reproduced on the screen 11 of the HMD 10 (block 115).

Preferably, the boresighting image ARB has an outline such as to correspond to the boresighting object OB seen through the windscreen 53 of the vehicle 5.

The screen position PAR on the screen 11 of the HMD 10 of the boresighting image ARB—i.e., the coordinates of the pixels of the screen 11 of the HMD 10 that are used to display the boresighting image ARB—is calculated starting from a set of world points {wpB} associated with a corresponding boresighting augmented reality object OAB. In particular, the boresighting augmented reality object OAB is a virtual replica of the boresighting object OB whose set of world points {wpB} is defined based on the position of the vehicle VP provided by the GNSS module 20.

Due to the different positions of the GNSS module 20 and the HMD 10, in general, the boresighting image ARB will not be superimposed on the boresighting object OB.

The boresighting image ARB is thus translated along the screen 11 of the HMD 10, until the boresighting image ARB is superimposed on the boresighting object OB—in a new screen position PAR'—visible through the windscreen 53 of the vehicle 5 (block 117). For example, the processing unit 30 may be configured to allow a user to move the boresighting image ARB, for example via a user interface (not illustrated) of the processing unit 30 or via a user interface of a device connected to the processing unit (for example the HMD 10 itself, or a personal computer, a smartphone, a tablet, an on-board computer of the vehicle 5, etc.).

The translation on the screen 11 of the HMD 10 which leads to the superimposition between the boresighting image ARB and the boresighting object OB is, therefore, processed to determine a compensation law capable of compensating for a discrepancy—or offset—between the boresighting image ARB and the boresighting object OB (block 119).

For example, the compensation law can be defined by a compensation matrix based on a rototranslation relationship between the set of world points {wpB}—associated with the boresighting augmented reality object OAB to which the boresighting image ARB corresponds—and the boresighting position PB—associated with the boresighting object OB.

In other words, the calibration procedure 100 establishes a relationship between the surrounding environment defined by coordinates of the global reference system, the position of the vehicle 5 provided by the GNSS module 20 with respect to the global reference system, the position of the HMD 10 through which the images IL, IR are acquired, and the position of the passenger compartment—in particular, the windscreen 53—of the vehicle 5 filmed by the cameras 15 of the HMD 10.

Upon completion of the calibration procedure 100, the system 1 is capable of reproducing in real time on the screen 11 of the HMD 10 one or more augmented reality images AR, each corresponding to a corresponding augmented reality object OA, so that they integrate with what is visible in the field of view FOV.

Figure 9:
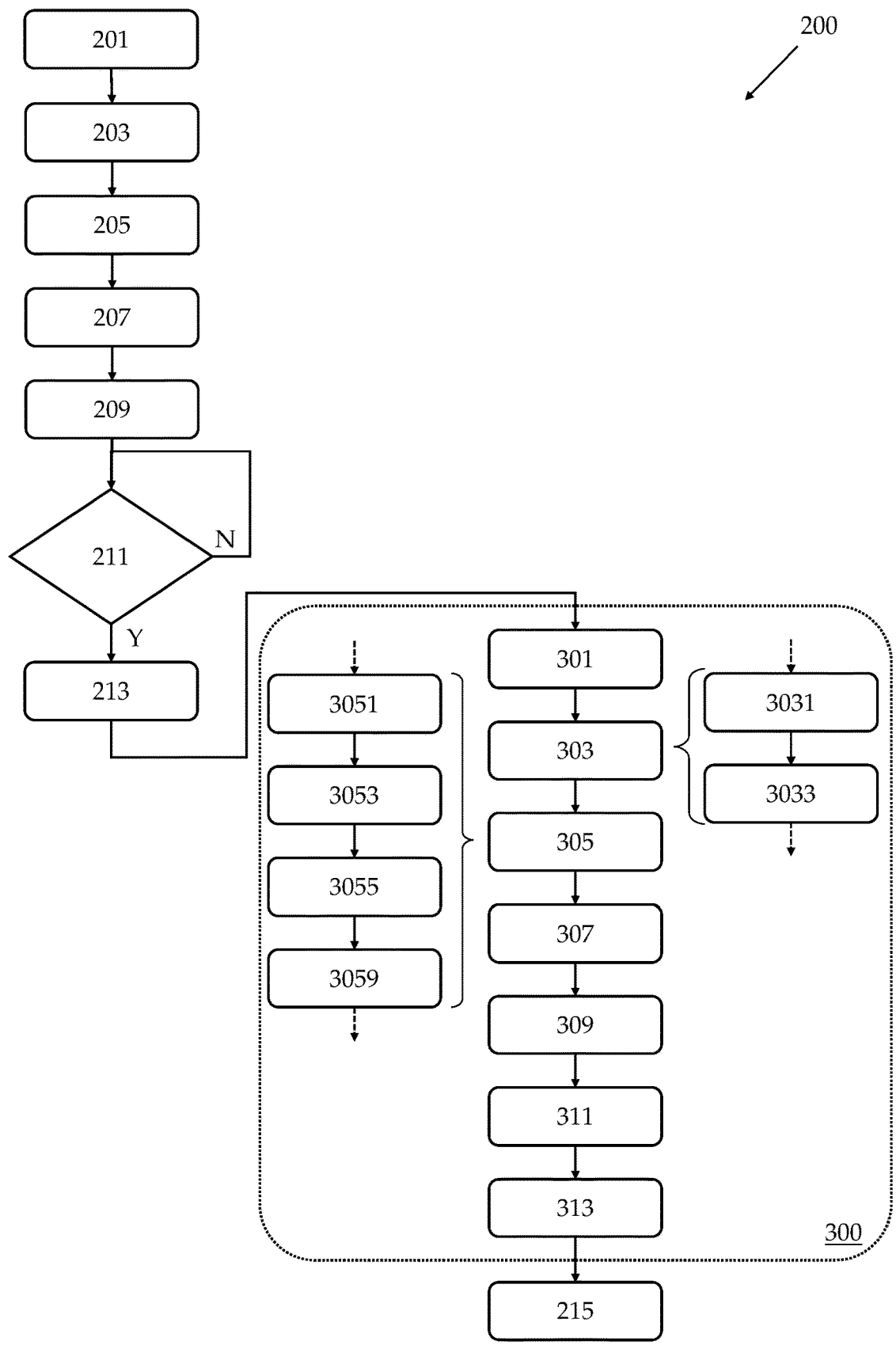
FIG. 9 is a flow diagram of an operating procedure for dynamically displaying augmented reality elements on the HMD according to an embodiment of the present invention.

In particular, the system 1 performs an operating procedure 200 of dynamic display of augmented reality elements (schematically illustrated in FIG. 9), which initially provides for determining the pose of the HMD 10 with respect to the markers 40 (block 201).

In other words, the calculation of the pose of each camera 15 with respect to each marker 40 is performed by acquiring pairs of images IL and IR through the cameras 15 to identify the relative positions and orientations between cameras 15 and markers 40, subsequently, these positions and orientations are combined to determine the position and orientation of the HMD 10 with respect to the markers 40 by exploiting the relationships determined during the alignment step of the calibration procedure 100.

Subsequently, or in parallel, the vehicle position PV is detected through the GNSS module 20 (block 203). Preferably, the position of the vehicle PV is detected at the same time as the pair of images is acquired; even more preferably, the position of the vehicle PV is detected simultaneously with the acquisition of the pair of images.

The position of the vehicle PV is thus modified by applying the compensation law defined during the boresighting step of the calibration procedure 100 in order to determine the position of the HMD 10 with respect to the global reference system (block 205).

In summary, steps 203-205 of the operating procedure 200 reliably determine in real time the position and the orientation of the HMD 10 with respect to the global reference system.

Figure 4B:
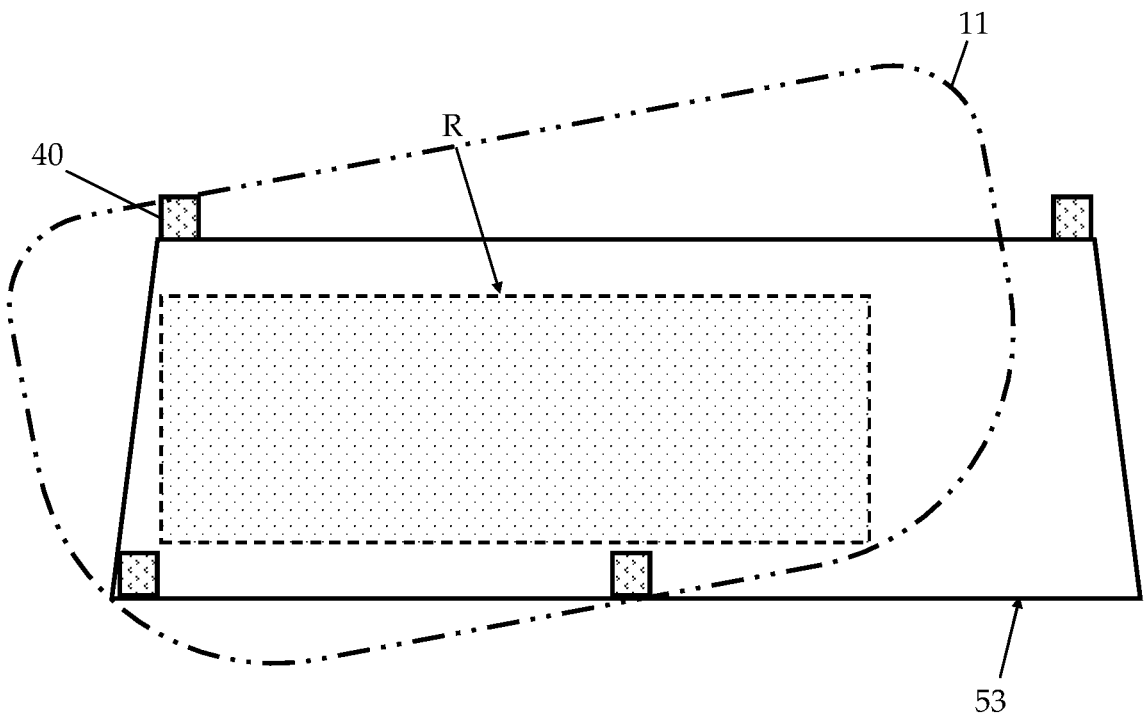
FIG. 4b is a schematic view illustrating a variation of a pose of an HMD comprised in the system of FIGS. 1 and 2.

Preferably, one or more identified markers 40 may be used to define the shape and extension of a displaying region R of the screen 11 in which images will be displayed, for example so that the images are displayed superimposed on the windscreen 53 of the vehicle 5 or on objects in the external environment that are visible through the windscreen 53 (block 207, as illustrated schematically in FIGS. 4a and 4b).

Based on the position and orientation of the HMD 10 with respect to the global reference system, a view volume VOL is determined, i.e. the volume of space comprised in the field of view FOV of the HMD 10 (block 209). Preferably, the view volume VOL (schematically illustrated in FIG. 2) extends within a distance—i.e., a depth of the field of view FOV-predetermined by a current position of the HMD 10—possibly modified based on parameters acquired by the IMU 6 and/or by the sensors of the vehicle 5 such as the speed and/or acceleration of the vehicle 5.

Subsequently, it is verified whether one or more augmented reality objects OA stored in the memory area are comprised in the view volume VOL (decision block 211). If not (output branch N of block 211), no action is taken.

In case, instead, one or more augmented reality objects OA are comprised in the view volume VOL (output branch Y of block 211), for each augmented reality object OA, a corresponding screen position AP on the screen 11 is calculated such that the user wearing the HMD 10 can see a corresponding augmented reality object OA in the contiguity of the respective set of world points {wp} (block 213). Advantageously, the screen position AP is calculated based on the position of the vehicle 5 and the position of the sets of world points {wp} in the set of coordinates of the global reference system.

In the preferred embodiment, the operating procedure 200 comprises a precise positioning sub-procedure 300 (as illustrated in the flow diagram of FIG. 9), which is configured to reproduce the augmented reality objects OA so that they optimally integrate with the surrounding environment observed by the user through the HMD 10 and the windscreen 53 of the vehicle 5. In particular, the sub-procedure 300 allows to obtain an optimal superposition—perceived by the user—between a virtual object OA and the road surface OR0 viewable through the HMD 10.

The precise positioning procedure 300 involves, using a pair of images IL, IR acquired by the cameras 15 of the HMD (block 301), preferably at the same instant of time. Advantageously, the images IL, IR are the same as those used by the procedure 200 to determine the field of view FOV and view volume VOL.

As already considered above, the images IL, IR of the pair capture the same portion of the field of view FOV visible to the observer wearing the HMD 10. In other words, at least part of the image IL is superimposable to a corresponding part of the image IR and vice versa.

In particular, considering the case in which the HMD 10 is facing the windscreen 53 of the vehicle 5 the acquired images IL, IR will depict the environment outside the vehicle 5 and, in particular, a portion of the road surface OR0 in front of the vehicle 5.

Figure 10:
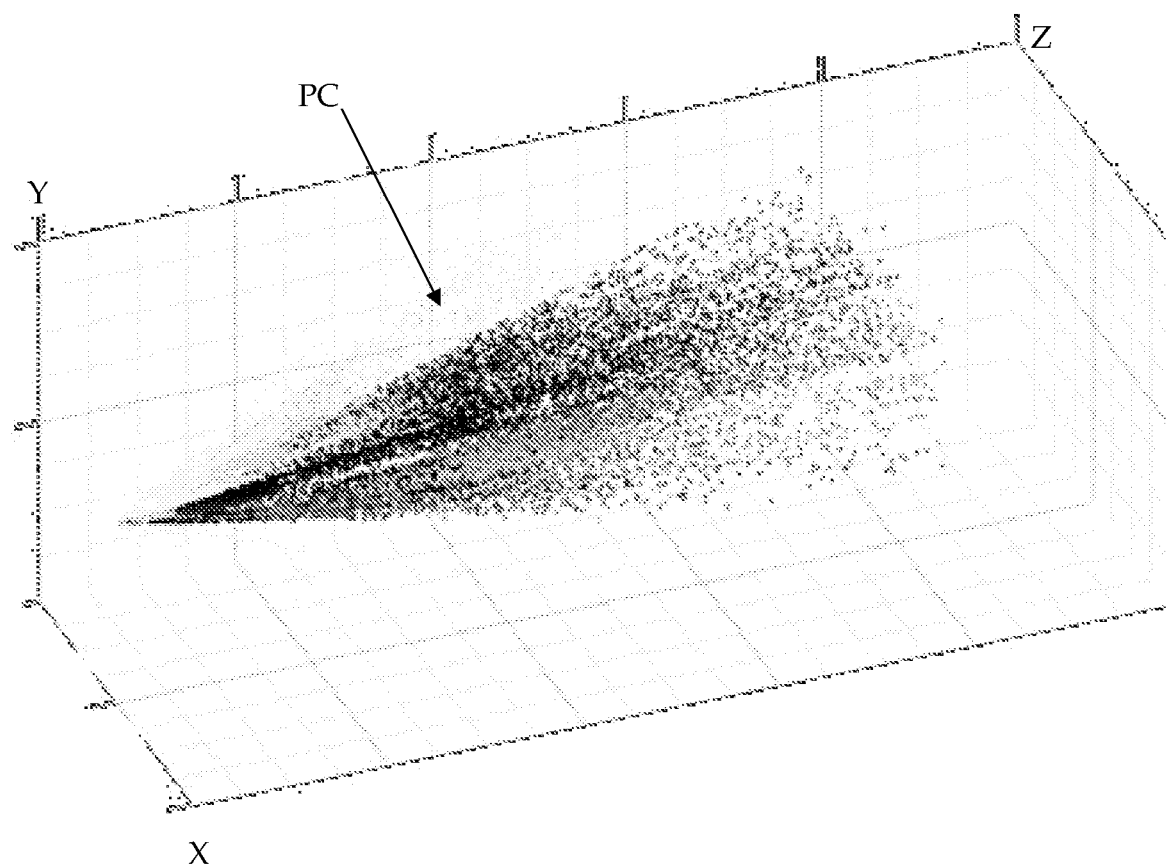
FIG. 10 is a qualitative diagram of a pointcloud processed starting from a pair of images acquired by the HMD while performing a sub-procedure for the precise positioning of the augmented reality images according to the present invention.

By processing the pair of images IL, IR, a position is estimated in a three-dimensional space of each point—for example, each pixel—of the images IL, IR belonging to the parts that can be superimposed on each other, so as to obtain a so-called pointcloud PC (block 303 and FIG. 10). In other words, a position in the view volume VOL of each point depicted in both images IL, IR is estimated.

In one embodiment, estimating the position of the points in the three-dimensional space first provides for calculating a disparity map (sub-block 3031) between the pixels corresponding to the same point of the pair of images IL, IR with respect to the other and, then calculating the position in the three-dimensional space of each point depicted in both images based on the pair of corresponding pixels (sub-block 3033), for example by triangulating each point starting from the pair of corresponding pixels and the associated disparity value identified by the disparity map.

In the preferred embodiment, the disparity map is calculated according to what is described in: H. Hirschmuller, "*Accurate and efficient stereo processing by semi-global matching and mutual information*", 2005 IEEE Computer Society Conference on Computer Vision and Pattern Recognition (CVPR'05), San Diego, CA, USA, 2005, pages 807-814 vol. 2. In addition, the triangulation of the points of the images IL, IR is calculated according to what is described in: R. Hartley, A. Zisserman, "Multiple View Geometry In Computer Vision" CUP, Cambridge, UK, 2003, p. 312.

Thereafter, it is envisaged to estimate a containment volume VC which comprises the road surface OR0 (block 305).

In the considered embodiment, the estimation of the containment volume VC comprising the road surface OR0 is carried out as follows.

Initially, a first estimation of the position of the road surface OR0 is performed starting from the acquired images IL, IR (sub-block 3051) by identifying the road surface and by applying the steps of the procedure 200 described above. In other words, the position of an augmented reality object OA superimposed on at least a portion of the road surface OR0 comprised in the view volume VOL—which is a real object OR to which a respective set of coordinates is associated in the global reference system—is estimated. In other words, the augmented reality object OA corresponds to an estimate of the position of the road surface OR0 determined following the procedure 200 up to the operations described in relation to block 213, i.e. based on a pair of images IL, IR and the position of the vehicle 5 detected in the contiguity of the acquisition of the images IL, IR.

In order to limit the presence of spurious elements, the containment volume VC, comprises a portion of the view volume VOL having a distance from the position of the HMD 10—parallel with respect to the direction of movement of the vehicle 5 or, more generally, in a direction parallel to a longitudinal length of the vehicle 5—equal to or greater than a minimum threshold value, for example comprised between 5 m and 15 m, preferably equal to 10 m. In this way, it is possible to exclude points of the pointcloud PC associated inside the passenger compartment of the vehicle 5 and the front portion of the vehicle 5 visible through the windscreen 53, therefore, comprised in the view volume VOL.

Furthermore, in order to reduce the computational burden, the containment volume VC, comprises a portion of the view volume VOL having a distance from the position of the HMD 10—parallel with respect to the direction of movement of the vehicle 5 or, more generally, in a direction parallel to a longitudinal length of the vehicle 5—equal to or less than a maximum threshold value, for example comprised between 50 m and 150 m, preferably equal to 100 m.

Advantageously, the containment volume VC is also limited to a portion of the view volume VOL having a width—transverse to the direction of movement of the vehicle 5 as well as to the longitudinal length thereof—substantially corresponding to the width of the road surface, for example comprised between 3 m and 12 m, preferably equal to 6 m.

Figure 11A:
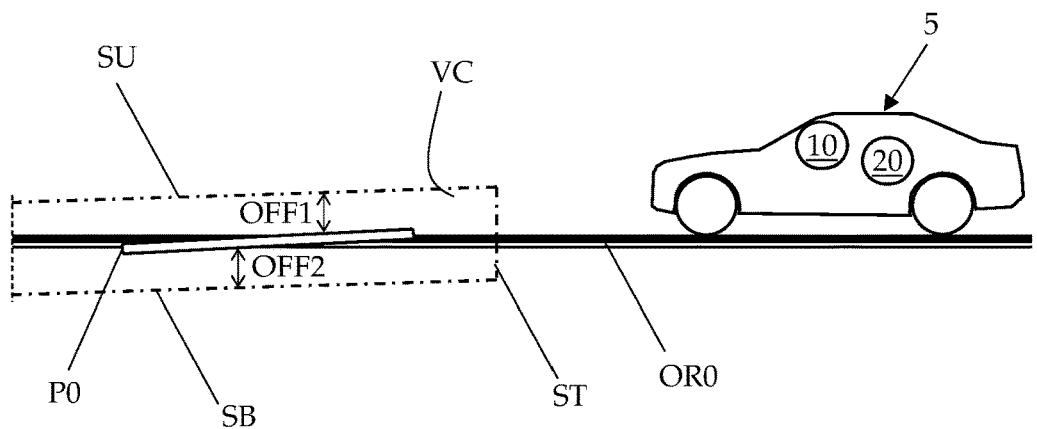
FIG. 11a is a schematic side view of a vehicle on a road surface while performing a sub-procedure for the precise positioning of the augmented reality images according to the present invention.
Figure 11B:
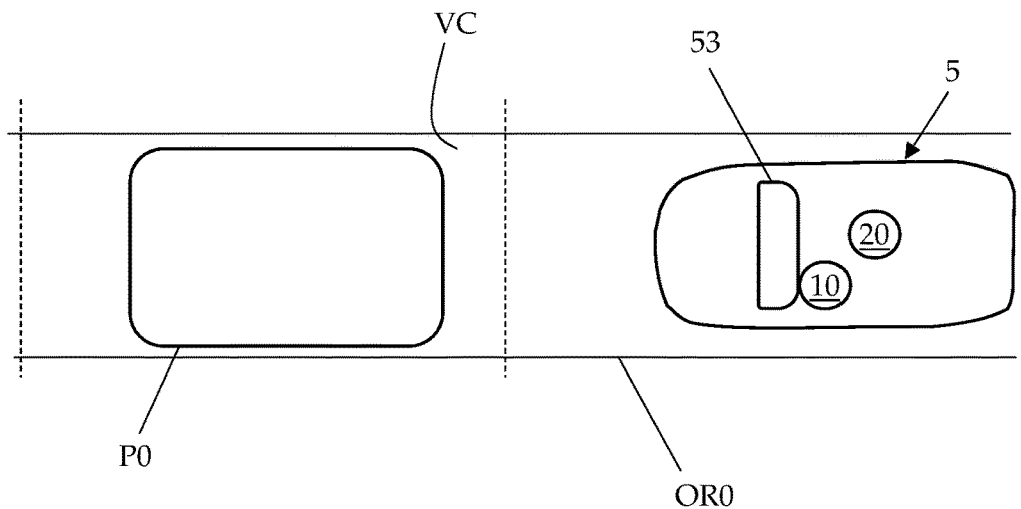
FIG. 11b is a schematic side view of a containment volume processed while performing a sub-procedure for the precise positioning of the augmented reality images according to the present invention.
Figure 12:
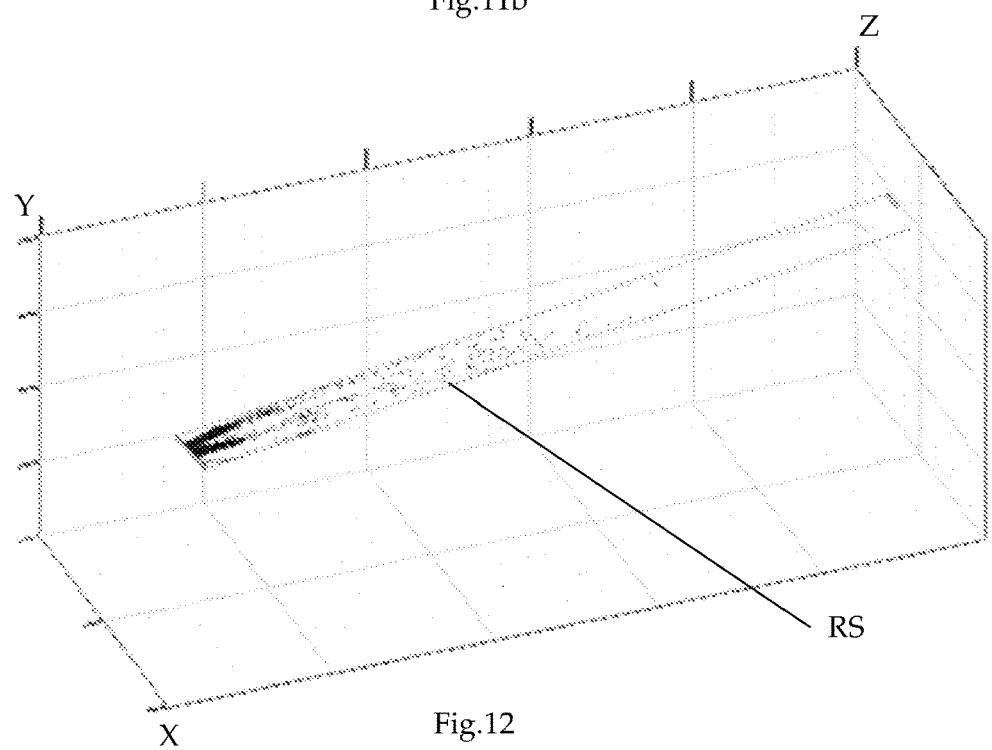
FIG. 12 is a qualitative diagram of a subset of points of the pointcloud belonging to the road surface determined while performing a sub-procedure for the precise positioning of the augmented reality images according to the present invention.

The containment volume VC is calculated starting from the estimated position P0 of the road surface OR0 (as illustrated schematically in FIGS. 11a and 11b). The volume VC is comprised between a pair of surfaces SU and SB parallel to the estimated position P0 of the road surface OR0 and extends starting from a transverse surface ST to the parallel surfaces SU and SB in the contiguity of the minimum threshold value of the distance between HMD 10 and the portion of road surface OR0 considered. In detail, an upper surface SU of the pair of parallel surfaces is determined by adding a first offset value OFF1 to the elevation value of the coordinates of the global reference system of each point of the estimated position P0 of the road surface portion OR0 (sub-block 3053). Similarly, the lower surface SB of the pair of surfaces is determined by subtracting a second offset value OFF2 from the elevation value of the coordinates of the global reference system of each point of the estimated position P0 of the road surface portion OR0 (sub-block 3055).

In a preferred embodiment, the first offset value OFF1 and the second offset value OFF2 correspond to and are determined based on the characteristics of the cameras 15 and the characteristics of the vehicle 5. In detail, the offset values decrease OFF1 and OFF2 as the accuracy of the cameras increases—or similarly as non-ideality, such as optical aberrations of the cameras, decreases. Furthermore, the offset values OFF1 and OFF2 depend directly on the stresses to which the vehicle 5 is subjected during movement and on the response of the vehicle 5 to the stresses. For example, the stiffer the suspension of vehicle 5, the less pitching experienced by vehicle 5 during movement, and consequently the less offset needed to compensate for the pitching.

Subsequently, a subset of points of the pointcloud PC comprised in the containment volume VC (block 307) is determined. In other words, the containment volume VC is configured to filter the pointcloud PC so as to isolate the subset of the points of the pointcloud PC that are most likely to actually belong to the road surface OR0. The subset of the points of the pointcloud PC belonging to the road surface OR0 is processed to calculate a planar surface RS corresponding to the road surface OR0 (block 309).

In the preferred embodiment, the subset of the points of the pointcloud PC is processed by means of an algorithm of M-estimator sample consensus (MSAC) type which allows a mathematical formula that expresses the planar surface RS in the three-dimensional reference system of the pointcloud to be determined. Preferably, the mathematical formula of the planar surface RS results in the form:

$$\alpha x + \beta y + \gamma z = \delta, \qquad (1)$$

where $\alpha$, $\beta$, $\gamma$, $\delta$ are coefficients determined by the MSAC-type algorithm based on the subset of the points of the pointcloud PC.

For example, the subset of the points of the pointcloud is processed as described in P. H. S. Torr, A. Zisserman: "*MLESAC: A New Robust Estimator with Application to Estimating Image Geometry*", Computer Vision and Image Understanding, Volume 78, Issue 1, 2000, pages 138-156.

Figure 13:
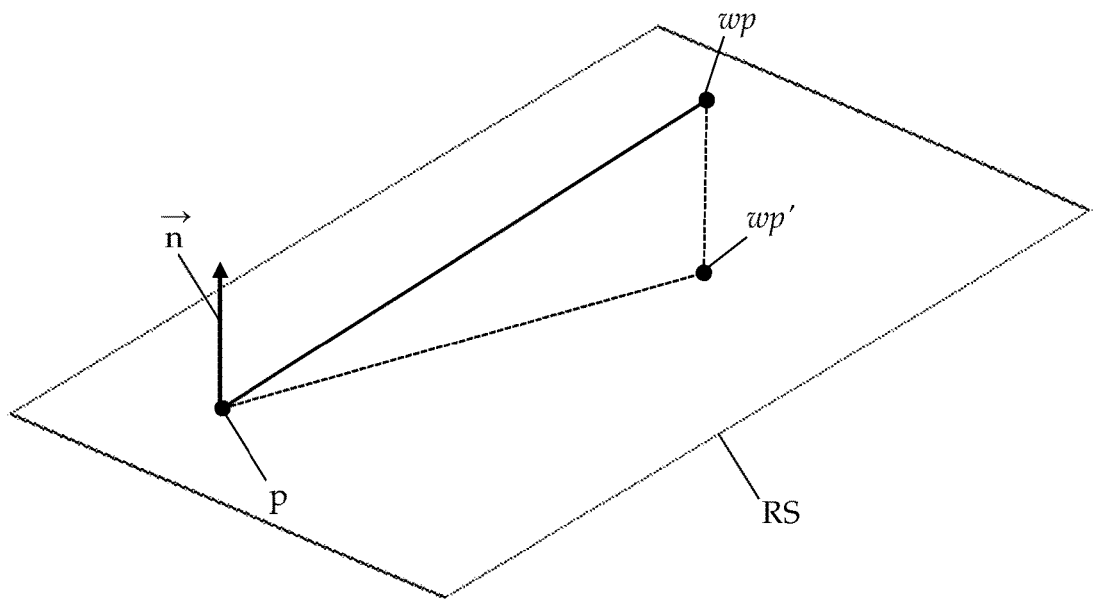
FIG. 13 is a schematic view illustrating a position correction of a point of a sub-procedure for the precise positioning of the augmented reality images according to the present invention.

Subsequently, each word point wp of the set of world points {wp} of an augmented reality object OA is recalculated based on the planar surface RS (block 311 and FIG. 13).

The calculated planar surface RS is used to correct the positioning of the augmented reality objects OA to be displayed through the HMD 10. In particular, the augmented reality objects OA to be displayed superimposed on the road surface OR0—such as optimal tracks OA1 and stop bands OA2—are correctly superimposed on the road surface OR0 in the user's field of view FOV thanks to the correction made starting from the planar surface RS.

In detail, given a generic word point wp of the set of world points {wp} of an augmented reality object OA to be placed on the road surface OR0 a corrected world point wp' is calculated as:

$$wp' = wp - (wp - p) \cdot \vec{n},$$

where p is the projection of the position of the HMD 10 on the planar surface and $\vec{n}$ is the vector normal to the planar surface.

The set of correct world points {wp'} is then used to determine a corresponding correct screen position AP' on the screen 11 (block 313). Accordingly, an augmented reality (two-dimensional) image AR is reproduced in the contiguity of the screen position AP' on the screen at the step described in relation to block 215 of the procedure 200. In this way, the user wearing the HMD 10 sees the augmented reality object OA in the contiguity of the respective set of correct world points {wp'}.

For each augmented reality object OA, therefore, a corresponding augmented reality image AR is reproduced on the screen 11 of the HMD 10 in the corresponding correct screen position AP' (block 215). Preferably, each augmented reality image AR is reproduced if it is comprised in the displaying region R of the screen 11 superimposed on the windscreen 53 of the vehicle 5.

Advantageously, the augmented reality image AR reproduced on the screen 11 is scaled and oriented according to the distance and relative position between the HMD 10 and the set of world points {wp} of the corresponding augmented reality objects OA in the global reference system.

Figure 14:
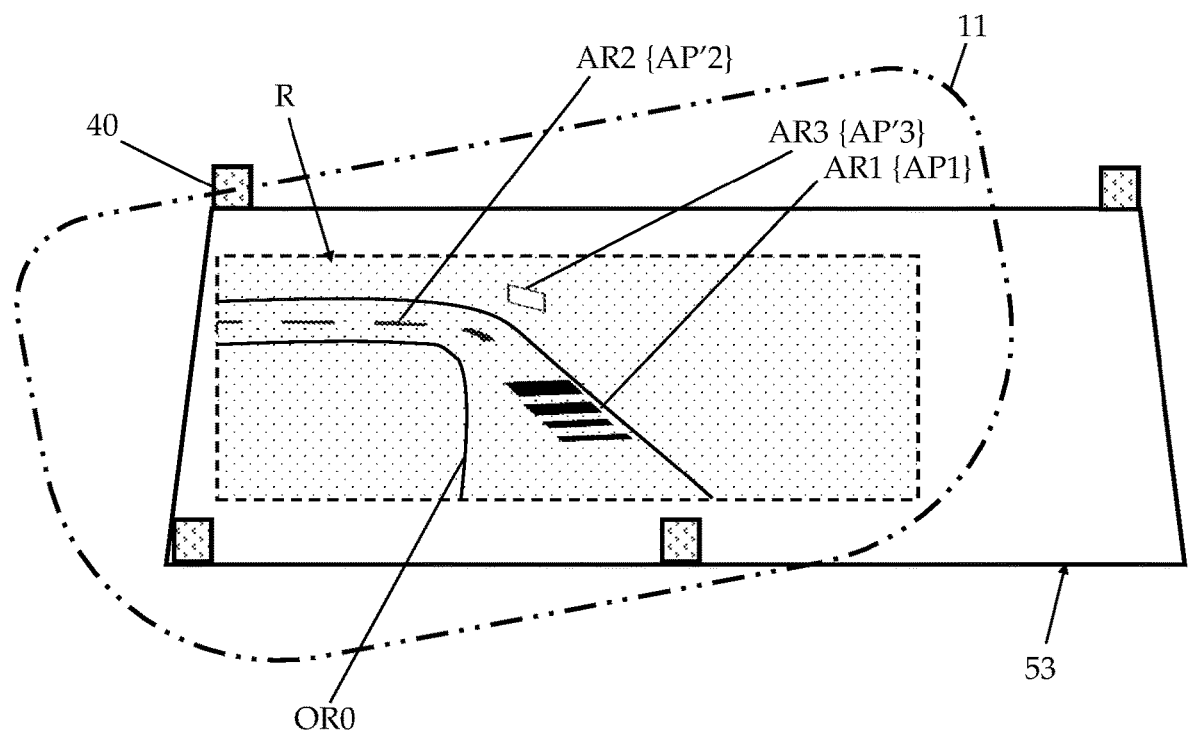
FIG. 14 is a schematic view illustrating the displaying of images associated with corresponding objects of interest on the HMD of the system.

For example, with reference to FIG. 14, it is provided to calculate a screen position AP'1-3 on the screen 11 in which to reproduce the augmented reality images AR1-3 corresponding to each of the augmented reality objects OA1-3 such that the user wearing the HMD 10 sees each augmented reality object OA1-3 in the contiguity of the respective set of world points {wp1-3} within the field of view FOV.

In particular, in the case of a two-dimensional augmented reality object OA to be displayed on the road surface, such as a strip indicating a track to be followed by the vehicle 5 or a stop line. The system provides for generating a first set of points of the augmented reality object OA along a direction transverse to the direction of movement of the vehicle and translating the points in a direction parallel to the vehicle until the extent of the augmented reality object OA is reached. In other words, once the first point of the augmented reality object OA is 'placed' on the estimated plane, the augmented reality object OA is increased to the desired dimensions (for example, width and length) desired—for example, to project a detached position or a trajectory—starting precisely from that first point projected onto the plane. In this way it can be ensured that the entirety of the augmented reality object OA belongs to the plane—as its vertices lie on it—and the dimensions perceived by the user are exactly those desired—without projection errors or distortion.

The procedure 200 is reiterated continuously during the use of the HMD 10, so as to update in real time the displaying of the augmented reality images as a function of the changes in the position of the vehicle 5 and of the HMD 10 over time and, therefore of the changes in the field of view FOV and view volume VOL over time.

In conclusion, a combination of the procedures 100, and 200, as well as the sub-procedure 300, presented above form a driving assistance method configured to provide real-time information to a user, in particular by reproducing augmented reality images on the screen 11 of the HMD 10 worn by the user.

However, it is clear that the above examples must not be interpreted in a limiting sense and the invention thus conceived is susceptible of numerous modifications and variations.

For example, one or more steps of the same procedure or of different procedures may be performed in parallel between each other or according to an order different from the above described one. Similarly, one or more optional steps can be added or removed from one or more of the procedures described above.

In one embodiment, the pose—i.e. relative position and orientation-of each camera 15 with respect to a marker 40 can be identified, through an algorithm based on what is described in F. Ababsa, M. Mallem, "*Robust Camera Pose Estimation Using 2D Fiducials Tracking for Real-Time Augmented Reality Systems*" International conference on Virtual Reality continuum and its applications in industry, pages 431-435, 2004.

However, there is nothing to prevent implementing an embodiment in which the markers 40 are not used and the position and orientation of the HMD 10 are determined by alternative means, for example by a filming system configured to film the user and detect the position and orientation of the HMD 10.

In addition or alternatively, the algorithm configured to identify the pose of the cameras may be based on the teachings contained in Madjid Maidi, Jean-Yves Didier, Fakhreddine Ababsa, Malik Mallem: "*A performance study for camera pose estimation using visual marker-based tracking*", published in Machine Vision and Application, Volume 21, Issue 3, pages 265-376, year 2010, and/or by Francisco J. Romero-Ramirez, Rafael Munoz-Salinas, Rafael MedinIRCarnicer: "*Speeded Up Detection of Squared Fiducial Markers*" published in Image and Vision Computing, Volume 76, year 2018.

In one embodiment, the augmented reality images AR may be generated so as to be displayed in the respective screen positions PA corresponding to as many sets of world points {wp} by implementing a similar algorithm of the function 'worldToImage' of the Computer Vision Toolbox™ comprised in the software product MATLAB® and described in "*Computer Vision Toolbox™ Reference*" revision for version 9.0 (Release R2019a), March 2019 by The MathWorks, Inc.

In one embodiment, the procedure 200 provides for modifying each augmented reality image AR reproduced on the screen 11 of the HMD 10—for example, by scale, perspective changes, etc.—as a function of the variation of the position of the HMD 10 and the set of world points {wp} of the corresponding augmented reality object OA as a function of time. In other words, a tracking of each world point wp is provided until the corresponding augmented reality object OA is comprised in the view volume VOL of the user wearing the HMD 10.

In one embodiment, the sub-procedure 300 is implemented only to generate an augmented reality image IR relating to an augmented reality object OA to be positioned on a portion of the road surface OR0. In the case of augmented reality objects OA not superimposed on the road surface OR0, the system 1 provides for omitting the sub-procedure 300, therefore, the augmented reality image is reproduced directly on the screen in the position AP (i.e., it is switched from block 213 to block 215).

In another embodiment, the sub-procedure 300 is implemented only to generate an augmented reality image IR relating to an augmented reality object OA whose position is expressed with a vertical coordinate with respect to the road plane.

In one embodiment, the estimation of the road surface OR0 is performed using the same object OA—or a portion thereof—to be displayed superimposed on the road surface OR0 for which the position AP was calculated in step 213.

Advantageously, the offset values OFF1 and OFF2 are calibrated under known conditions with a calibration step similar to the boresighting step during which it is verified that the containment volume VC comprises all the points associated with the road surface of a pointcloud referring to a known test condition. Preferably, the offset values OFF1 and OFF2 are dynamically corrected during the movement of the vehicle 5 based on information on the operation of the shock absorbers which is acquired via the data BUS 55 of the vehicle 5.

In one embodiment, the procedure 200 and/or the sub-procedure 300 are reiterated periodically. Preferably, the frequency of reiteration of the procedure 200 and/or of the sub-procedure 300 is variable as a function of a frequency of movement of the user's head—measured by means of sensors of the HMD 10 or of the FOV variations of the images acquired by the cameras 15—and/or of the rotational movements—i.e., roll and pitching—of the vehicle 5. Preferably, the frequency of reiteration of the procedure 200 and/or of the sub-procedure 300 is greater than 30 Hz, preferably greater than or equal to 40 Hz.

In addition or alternatively, the frequency of reiteration of the procedure 200 and/or the sub-procedure 300 is variable as a function of the speed of the vehicle 5, e.g. it increases as the speed of the vehicle 5 increases.

In one embodiment, the alignment step provides for determining a scale value and/or correction factors to compensate for deformations and/or aberrations introduced by the specific characteristics of the cameras 15 used. Alternatively or in addition, the position and the calculated orientation of each marker 40 with respect to the HDM 10 may be filtered over time to remove any noise.

In one embodiment, the alignment step provides for calculating the rototranslations linking the position of each marker 40 to the main marker 40 for each position of the markers 40 determined by analysing pairs of images IL and IR acquired in subsequent time instants. The rototranslations calculated for each marker 40 are then time-averaged in order to obtain a single rototranslation for each marker 40 with respect to the main marker 40.

Naturally, all the details can be replaced with other technically-equivalent elements.

In conclusion, the materials used, as well as the contingent shapes and dimensions of the aforementioned devices, apparatuses and terminals, may be any according to the specific implementation requirements without thereby abandoning the scope of protection of the following claims.

The invention claimed is:

1. A method of assisting driving a vehicle implemented by a system comprising a head mounted display (HMD) and a positioning module mounted on the vehicle, wherein the HMD comprises a screen and a pair of video cameras located on opposite sides of the screen along a main length direction of the screen, the method comprising the steps of:
   a. acquiring a pair of images by the HMD, each image being acquired by a respective camera of the HMD and framing a same portion of field of view, said same portion of field of view comprising a portion of road surface;
   b. estimating a position in a three-dimensional space of each point comprised in the same portion of field of view based on the pair of acquired images and the characteristics of the cameras;
   c. estimating a volume of interest of the three-dimensional space comprising the portion of the road surface based on the pair of images acquired and a position determined by the positioning module in the contiguity of the acquisition of the pair of images;
   d. selecting a subset of points comprised in the same portion of the field of view and comprised in the volume of interest;
   e. calculating a planar surface (RS) corresponding to the road surface based on the estimated position of the points comprised in the subset of selected points, and
   g. reproducing a two-dimensional image on the screen of the HMD so that it is arranged on the planar surface corresponding to the road surface calculated in step e.

2. The method according to claim 1, wherein each acquired image comprises a plurality of pixels arranged aligned along rows and columns, and wherein step b. estimating a position in a three-dimensional space of each point comprised in the same portion of the visual field comprises:
   for each pixel of an image of the pair associated with a point comprised in the same portion of the field of view, identifying a corresponding pixel in the other image of the pair associated with the same point comprised in the same portion of the field of view, and
   determining a position of said point in the three-dimensional space by performing a triangulation of the point based on said pair of pixels.

3. The method according to claim 2, wherein the step of identifying a corresponding pixel in the other image of the pair comprises:
   calculating a disparity map by comparing the images of the couple, and determining a position of said point in three-dimensional space comprises:
   using a disparity value between the corresponding pixels of the pair of images comprised in the disparity map in the triangulation of the point.

4. The method according to claim 1, wherein step c. of estimating a volume of interest of the three-dimensional space comprising the portion of the road surface comprises:
   estimating an approximate position of the portion of the road surface based on the pair of images and of the position determined by the positioning module in the contiguity of the acquisition of the pair of images;
   calculating or selecting a first offset value;
   calculating or selecting a second offset value;
   defining the volume of interest as a volume delimited by a first boundary surface positioned at a height equal to the approximate position of the portion of the road surface plus the first value offset of and a second boundary surface positioned at a height equal to the approximate position of the portion of road surface minus the second offset value.

5. The method according to claim 4, wherein the volume of interest extends:
   starting from a distance from the position of the HMD equal to or greater than a minimum threshold value in a direction parallel to a longitudinal length of the vehicle, and
   up to a distance from the position of the HMD (equal to or less than a maximum threshold value in the direction parallel to a longitudinal length of the vehicle.

6. The method according to claim 4, wherein the volume of interest has a width substantially corresponding to the width of the road surface in a direction transverse to a longitudinal length of the vehicle.

7. The method according to claim 1, wherein step e. of calculating a planar surface comprises:
   elaborating the subset of points of the same portion of the visual field comprised in the volume of interest by an algorithm of the M-estimator sample consensus type.

8. The method according to claim 7, wherein correcting each point of the set of points of a three-dimensional space comprises:
   calculating each correct point as:

$$wp' = wp - (wp - p) \cdot \vec{n},$$

where wp is the coordinate of the point, wp' is the corrected coordinate of the point, p is the projection of the position of the HMD on the planar surface and "is the vector normal to the planar surface.

9. The method according to claim 1, wherein the system further comprises at least one reference element arranged inside the vehicle,
   wherein each two-dimensional image to be reproduced on the screen of the HMD represents a virtual object defined by a set of points of a three-dimensional space, and
   the method further comprises:
   determining a position of the HMD based on the position determined by the positioning module, and of a position of the at least one reference element framed by the cameras of the HMD, based on the position of the HMD, determining a view volume corresponding to a volume of space comprised in the field of view of the HMD;

when at least one virtual object to be reproduced as a two-dimensional image is comprised in the view volume, step g. of reproducing a two-dimensional image on the screen of the HMD comprises:

correcting each point of the set of points of a three-dimensional space based on the position determined by the positioning module and of the planar surface calculated in step e., and calculating a screen position in which display the two-dimensional image associated with the virtual object based on the correct points of the set of points, and reproducing the two-dimensional image on the display of the HMD in the screen position.

10. A system for assisting driving a vehicle, comprising:

an HMD comprising a screen and a pair of video cameras located on opposite sides of the screen along a main length direction of the screen;

a positioning module mounted on the vehicle configured to detect a position of the vehicle, a memory area in which at least one set of points associated with a virtual object to be displayed as a two-dimensional image is stored, and a processing unit operatively connected to the positioning module, to the HMD, and configured to implement the method according to claim 1.

\* \* \* \* \*